United States Patent
Elomari (12)

(10) Patent No.: US 6,776,973 B2
(45) Date of Patent: Aug. 17, 2004

(54) USING MOLECULAR SIEVE SSZ-63 FOR REDUCTION OF OXIDES OF NITROGEN IN A GAS STREAM

(75) Inventor: Saleh Elomari, Fairfield, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 10/329,600

(22) Filed: Dec. 26, 2002

(65) Prior Publication Data

US 2004/0127346 A1 Jul. 1, 2004

(51) Int. Cl.⁷ .................................................. F01N 3/10
(52) U.S. Cl. ................................ 423/239.2; 423/213.2; 423/213.5
(58) Field of Search ........................... 423/213.2, 213.5, 423/239.2

(56) References Cited

U.S. PATENT DOCUMENTS 6,569,401 B1 * 5/2003 Elomari ...................... 423/718
2003/0133870 A1 * 7/2003 Chen et al. .................. 423/713

OTHER PUBLICATIONS

Higgins et al., "The Framework Topology of Zeolite Beta", *Zeolities*, 1988, vol. 8, pp. 446–452.
Higgins et al., "The Framework Topology of Zeolite Beta—A Correction", *Zeolites*, 1989, vol. 9, p. 358.

* cited by examiner

*Primary Examiner*—Kiley Stoner
*Assistant Examiner*—Christina Ildebrando
(74) *Attorney, Agent, or Firm*—Richard J. Sheridan

(57) ABSTRACT

The present invention relates to new crystalline molecular sieve SSZ-63 prepared using N-cyclodecyl-N-methyl-pyrrolidinium cation as a structure-directing agent, methods for synthesizing SSZ-63 and processes employing SSZ-63 in a catalyst.

4 Claims, 1 Drawing Sheet

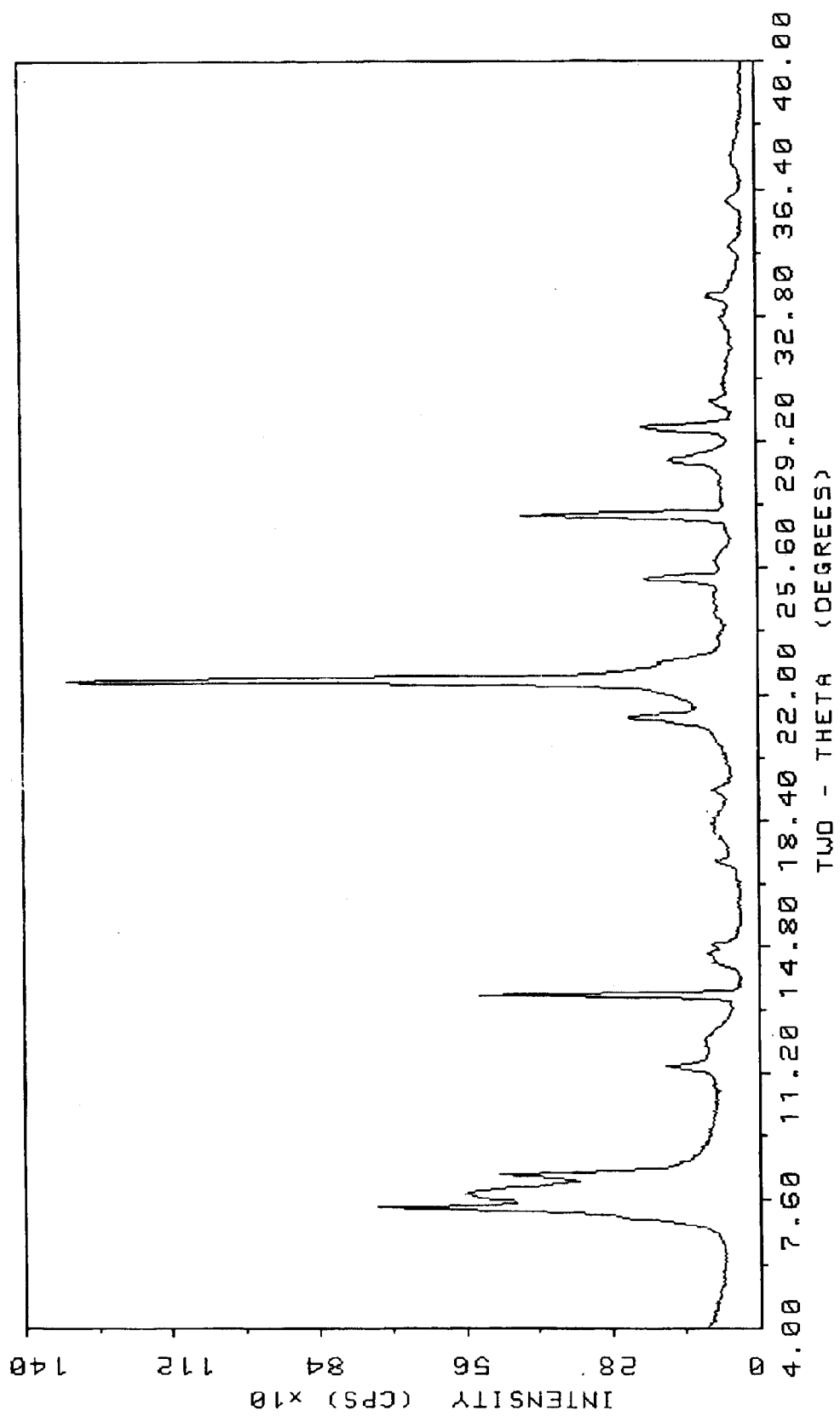

USING MOLECULAR SIEVE SSZ-63 FOR REDUCTION OF OXIDES OF NITROGEN IN A GAS STREAM

BACKGROUND OF THE INVENTION

1. Field of the Invention

The present invention relates to new crystalline molecular sieve SSZ-63, a method for preparing SSZ-63 using N-cyclodecyl-N-methyl-pyrrolidinium cation as a structure directing agent and the use of SSZ-63 in catalysts for, e.g., hydrocarbon conversion reactions.

2. State of the Art

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new zeolites with desirable properties for gas separation and drying, hydrocarbon and chemical conversions, and other applications. New zeolites may contain novel internal pore architectures, providing enhanced selectivities in these processes.

Crystalline aluminosilicates are usually prepared from aqueous reaction mixtures containing alkali or alkaline earth metal oxides, silica, and alumina. Crystalline borosilicates are usually prepared under similar reaction conditions except that boron is used in place of aluminum. By varying the synthesis conditions and the composition of the reaction mixture, different zeolites can often be formed.

SUMMARY OF THE INVENTION

The present invention is directed to a family of crystalline molecular sieves with unique properties, referred to herein as "molecular sieve SSZ-63" or simply "SSZ-63". Preferably, SSZ-63 is obtained in its silicate, aluminosilicate, titanosilicate, germanosilicate, vanadosilicate or borosilicate form. The term "silicate" refers to a molecular sieve having a high mole ratio of silicon oxide relative to aluminum oxide, preferably a mole ratio greater than 100, including molecular sieves comprised entirely of silicon oxide. As used herein, the term "aluminosilicate" refers to a molecular sieve containing both alumina and silica and the term "borosilicate" refers to a molecular sieve containing oxides of both boron and silicon.

In accordance with this invention, there is provided an improved process for the reduction of oxides of nitrogen contained in a gas stream in the presence of oxygen wherein said process comprises contacting the gas stream with a zeolite, the improvement comprising using as the zeolite a zeolite having a mole ratio greater than about 15 of an oxide of a first tetravalent element to an oxide of a second tetravalent element different from said first tetravalent element, trivalent element, pentavalent element or mixture thereof and having, after calcination, the X-ray diffraction lines of Table II. The zeolite may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine.

BRIEF DESCRIPTION OF THE DRAWING

The drawing is a powder X-ray diffraction pattern of calcined SSZ-63.

DETAILED DESCRIPTION OF THE INVENTION

The present invention comprises a family of crystalline, large pore molecular sieves designated herein "molecular sieve SSZ-63" or simply "SSZ-63". As used herein, the term "large pore" means having an average pore size diameter greater than about 6.0 Angstroms, preferably from about 6.5 Angstroms to about 7.5 Angstroms.

While not wishing to be bound by any theory, it is believed that the crystal structure of SSZ-63 consists of two polymorphs of zeolite beta. Typical zeolite beta (BEA*) has a crystal structure consisting of about a 50/50 combination of two polymorphs, polymorph A and polymorph B. It is believed that the crystal structure of SSZ-63 consists of about 60–70% of a beta polymorph referred to herein as beta-C (Higgins) with the remainder being beta polymorph B. Beta polymorph C (Higgins) is different from beta polymorph C. The structure of polymorph C (Higgins) has been postulated in the literature, but it is believed that polymorph C (Higgins) has heretofore not been made. A discussion of polymorph C (Higgins) can be found in Higgins et al, "The framework Topology of Zeolite Beta", *Zeolites,* 1988, vol. 8, pp.446–452, with a correction at Higgins et al., "The Framework Topology of Zeolite Beta—A Correction", *Zeolites,* 1989, vol. 9, p. 358.

In preparing SSZ-63, N-cyclodecyl-N-methyl-pyrrolidinium cation is used as a structure directing agent ("SDA"), also known as a crystallization template. In general, SSZ-63 is prepared by contacting an active source of one or more oxides selected from the group consisting of monovalent element oxides, divalent element oxides, trivalent element oxides, tetravalent element oxides and pentavalent elements with the N-cyclodecyl-N-methyl-pyrrolidinium cation SDA.

SSZ-63 is prepared from a reaction mixture having the composition shown in Table A below.

TABLE A

| | Reaction Mixture | |
|---|---|---|
| | Typical | Preferred |
| $YO_2/W_aO_b$ | >15 | 30–70 |
| $OH^-/YO_2$ | 0.10–0.50 | 0.20–0.30 |
| $Q/YO_2$ | 0.05–0.50 | 0.10–0.20 |
| $M_{2/n}/YO_2$ | 0.02–0.40 | 0.10–0.25 |
| $H_2O/YO_2$ | 30–80 | 35–45 | where Y, W, Q, M and n are as defined above, and a is 1 or 2, and b is 2 when a is 1 (i.e., W is tetravalent) and b is 3 when a is 2 (i.e., W is trivalent).

In practice, SSZ-63 is prepared by a process comprising:

(a) preparing an aqueous solution containing sources of at least one oxide capable of forming a crystalline molecular sieve and a N-cyclodecyl-N-methyl-pyrrolidinium cation having an anionic counterion which is not detrimental to the formation of SSZ-63;

(b) maintaining the aqueous solution under conditions sufficient to form crystals of SSZ-63; and (c) recovering the crystals of SSZ-63.

Accordingly, SSZ-63 may comprise the crystalline material and the SDA in combination with metallic and non-metallic oxides bonded in tetrahedral coordination through shared oxygen atoms to form a cross-linked three dimensional crystal structure. The metallic and non-metallic oxides comprise one or a combination of oxides of a first tetravalent element(s), and one or a combination of a trivalent element(s), pentavalent element(s), second tetravalent element(s) different from the first tetravalent element(s) or mixture thereof. The first tetravalent element(s) is preferably selected from the group consisting of silicon, germanium and combinations thereof. More preferably, the first tetravalent element is silicon. The trivalent element, pentavalent element and second tetravalent element (which is different from the first tetravalent element) is preferably selected from the group consisting of aluminum, gallium, iron, boron, titanium, indium, vanadium and combinations thereof. More preferably, the second trivalent or tetravalent element is aluminum or boron.

Typical sources of aluminum oxide for the reaction mixture include aluminates, alumina, aluminum colloids, aluminum oxide coated on silica sol, hydrated alumina gels such as $Al(OH)_3$ and aluminum compounds such as $AlCl_3$ and $Al_2(SO_4)_3$. Typical sources of silicon oxide include silicates, silica hydrogel, silicic acid, fumed silica, colloidal silica, tetra-alkyl orthosilicates, and silica hydroxides. Boron, as well as gallium, germanium, titanium, indium, vanadium and iron, can be added in forms corresponding to their aluminum and silicon counterparts.

A source zeolite reagent may provide a source of aluminum or boron. In most cases, the source zeolite also provides a source of silica. The source zeolite in its dealuminated or deboronated form may also be used as a source of silica, with additional silicon added using, for example, the conventional sources listed above. Use of a source zeolite reagent as a source of alumina for the present process is more completely described in U.S. Pat. No. 5,225,179, issued Jul. 6, 1993 to Nakagawa entitled "Method of Making Molecular Sieves", the disclosure of which is incorporated herein by reference.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The SDA may be used to provide hydroxide ion. Thus, it may be beneficial to ion exchange, for example, the halide to hydroxide ion, thereby reducing or eliminating the alkali metal hydroxide quantity required. The alkali metal cation or alkaline earth cation may be part of the as-synthesized crystalline oxide material, in order to balance valence electron charges therein.

The reaction mixture is maintained at an elevated temperature until the crystals of the SSZ-63 are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the molecular sieve is prepared using mild stirring or agitation.

During the hydrothermal crystallization step, the SSZ-63 crystals can be allowed to nucleate spontaneously from the reaction mixture. The use of SSZ-63 crystals as seed material can be advantageous in decreasing the time necessary for complete crystallization to occur. In addition, seeding can lead to an increased purity of the product obtained by promoting the nucleation and/or formation of SSZ-63 over any undesired phases. When used as seeds, SSZ-63 crystals are added in an amount between 0.1 and 10% of the weight of silica used in the reaction mixture.

Once the molecular sieve crystals have formed, the solid product is separated from the reaction mixture by standard mechanical separation techniques such as filtration. The crystals are water-washed and then dried, e.g., at 90° C. to 150° C. for from 8 to 24 hours, to obtain the as-synthesized SSZ-63 crystals. The drying step can be performed at atmospheric pressure or under vacuum.

SSZ-63 as prepared has a mole ratio of an oxide selected from silicon oxide, germanium oxide and mixtures thereof to an oxide selected from aluminum oxide, gallium oxide, iron oxide, boron oxide, titanium oxide, indium oxide, vanadium oxide and mixtures thereof greater than about 15; and has, after calcination, the X-ray diffraction lines of Table II below. SSZ-63 further has a composition, as synthesized (i.e., prior to removal of the SDA from the SSZ-63) and in the anhydrous state, in terms of mole ratios, shown in Table B below.

TABLE B

| As-Synthesized SSZ-63 | |
|---|---|
| $YO_2/W_cO_d$ | >15 |
| $M_{2/n}/YO_2$ | 0.01–0.03 |
| $Q/YO_2$ | 0.02–0.05 | where Y, W, c, d, M, n and Q are as defined above.

SSZ-63 can be made essentially aluminum free, i.e., having a silica to alumina mole ratio of ∞. A method of increasing the mole ratio of silica to alumina is by using standard acid leaching or chelating treatments. However, essentially aluminum-free SSZ-63 can be synthesized directly using essentially aluminum-free silicon sources as the main tetrahedral metal oxide component, if boron is also present. The boron can then be removed, if desired, by treating the borosilicate SSZ-63 with acetic acid at elevated temperature (as described in Jones et al., *Chem. Mater.*, 2001, 13, 1041–1050) to produce an all-silica version of SSZ-63. SSZ-63 can also be prepared directly as a borosilicate. If desired, the boron can be removed as described above and replaced with metal atoms by techniques known in the art to make, e.g., an aluminosilicate version of SSZ-63. SSZ-63 can also be prepared directly as an aluminosilicate.

Lower silica to alumina ratios may also be obtained by using methods which insert aluminum into the crystalline framework. For example, aluminum insertion may occur by thermal treatment of the zeolite in combination with an alumina binder or dissolved source of alumina. Such procedures are described in U.S. Pat. No. 4,559,315, issued on Dec. 17, 1985 to Chang et al.

It is believed that SSZ-63 is comprised of a new framework structure or topology which is characterized by its X-ray diffraction pattern. SSZ-63, as-synthesized, has a crystalline structure whose X-ray powder diffraction pattern exhibit the characteristic lines shown in Table I and is thereby distinguished from other molecular sieves.

TABLE I

| As-Synthesized SSZ-63 | | |
|---|---|---|
| 2 Theta | d-spacing (Angstroms) | Relative Intensity (%) |
| 7.17 | 12.32 | W |
| 7.46 | 11.84 | W |
| 7.86 | 11.24 | W |
| 8.32 | 10.62 | W |
| 21.42 | 4.15 | M |
| 22.46 | 3.96 | VS |

TABLE I-continued

As-Synthesized SSZ-63

| 2 Theta | d-spacing (Angstroms) | Relative Intensity (%) |
|---|---|---|
| 22.85 | 3.89 | W |
| 25.38 | 3.51 | W |
| 27.08 | 3.29 | W |
| 29.62 | 3.01 | W |

(a) ±0.2
(b) The X-ray patterns provided are based on a relative intensity scale in which the strongest line in the X-ray pattern is assigned a value of 100:
W (weak) is less than 20;
M (medium) is between 20 and 40;
S (strong) is between 40 and 60;
VS (very strong) is greater than 60.

Table IA below shows the X-ray powder diffraction lines for as-synthesized SSZ-63 including actual relative intensities.

TABLE IA

| 2 Theta(a) | d-spacing (Angstroms) | Relative Intensity (%) |
|---|---|---|
| 7.17 | 12.32 | 5.1 |
| 7.46 | 11.84 | 13.5 |
| 7.86 | 11.24 | 10.2 |
| 8.32 | 10.62 | 4.7 |
| 13.38 | 6.61 | 1.7 |
| 17.20 | 5.15 | 1.4 |
| 18.21 | 4.87 | 2.0 |
| 19.29 | 4.60 | 1.5 |
| 21.42 | 4.15 | 15.7 |
| 22.46 | 3.96 | 100.0 |
| 22.85 | 3.89 | 6.9 |
| 25.38 | 3.51 | 6.7 |
| 26.02 | 3.42 | 1.8 |
| 27.08 | 3.29 | 12.3 |
| 28.80 | 3.10 | 3.2 |
| 29.62 | 3.01 | 8.5 |
| 30.50 | 2.93 | 2.9 |
| 32.88 | 2.72 | 1.4 |
| 33.48 | 2.67 | 5.7 |
| 34.76 | 2.58 | 1.8 |
| 36.29 | 2.47 | 1.6 |
| 37.46 | 2.40 | 1.3 |

(a) ±0.2

After calcination, the SSZ-63 molecular sieves have a crystalline structure whose X-ray powder diffraction pattern include the characteristic lines shown in Table II:

TABLE II

Calcined SSZ-63

| 2 Theta | d-spacing (Angstroms) | Relative Intensity (%) |
|---|---|---|
| 7.19 | 12.29 | M |
| 7.42 | 11.91 | VS |
| 7.82 | 11.30 | VS |
| 8.30 | 10.64 | M |
| 13.40 | 6.60 | M |
| 21.46 | 4.14 | W |
| 22.50 | 3.95 | VS |
| 22.81 | 3.90 | W |
| 27.14 | 3.28 | M |
| 29.70 | 3.06 | W |

(a) ±0.2

Table IIA below shows the X-ray powder diffraction lines for calcined SSZ-63 including actual relative intensities.

TABLE IIA

| 2 Theta | d-spacing (Angstroms) | Relative Intensity (%) |
|---|---|---|
| 7.19 | 12.29 | 27.7 |
| 7.42 | 11.91 | 68.5 |
| 7.82 | 11.29 | 67.0 |
| 8.30 | 10.64 | 40.1 |
| 10.46 | 8.45 | 3.1 |
| 11.31 | 7.82 | 6.7 |
| 13.40 | 6.60 | 25.1 |
| 14.38 | 6.16 | 5.3 |
| 14.60 | 6.06 | 6.5 |
| 21.46 | 4.14 | 11.2 |
| 22.50 | 3.95 | 100.0 |
| 22.81 | 3.90 | 13.0 |
| 25.42 | 3.50 | 9.2 |
| 27.14 | 3.28 | 19.6 |
| 28.80 | 3.10 | 8.2 |
| 29.70 | 3.01 | 11.0 |
| 30.48 | 2.93 | 3.3 |
| 33.56 | 2.67 | 3.9 |
| 34.86 | 2.57 | 3.3 |
| 36.29 | 2.47 | 3.2 |
| 37.64 | 2.39 | 2.8 |

(a) ±0.2

The X-ray powder diffraction patterns were determined by standard techniques. The radiation was the K-alpha/doublet of copper. The peak heights and the positions, as a function of 2θ where θ is the Bragg angle, were read from the relative intensities of the peaks, and d, the interplanar spacing in Angstroms corresponding to the recorded lines, can be calculated.

The variation in the scattering angle (two theta) measurements, due to instrument error and to differences between individual samples, is estimated at ±0.20 degrees.

The X-ray diffraction pattern of Table I is representative of "as-synthesized" or "as-made" SSZ-63 molecular sieves. Minor variations in the diffraction pattern can result from variations in the silica-to-alumina or silica-to-boron mole ratio of the particular sample due to changes in lattice constants. In addition, sufficiently small crystals will affect the shape and intensity of peaks, leading to significant peak broadening.

Representative peaks from the X-ray diffraction pattern of calcined SSZ-63 are shown in Table II. Calcination can also result in changes in the intensities of the peaks as compared to patterns of the "as-made" material, as well as minor shifts in the diffraction pattern. The molecular sieve produced by exchanging the metal or other cations present in the molecular sieve with various other cations (such as $H^+$ or $NH_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

Crystalline SSZ-63 can be used as-synthesized, but preferably will be thermally treated (calcined). Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica to alumina mole ratio. The molecular sieve can also be steamed; steaming helps stabilize the crystalline lattice to attack from acids.

The molecular sieve can be used in intimate combination with hydrogenating components, such as tungsten, vanadium, molybdenum, rhenium, nickel, cobalt, chromium, manganese, or a noble metal, such as palladium or platinum, for those applications in which a hydrogenation-dehydrogenation function is desired.

Metals may also be introduced into the molecular sieve by replacing some of the cations in the molecular sieve with metal cations via standard ion exchange techniques (see, for example, U.S. Pat. No. 3,140,249 issued Jul. 7, 1964 to Plank et al.; U.S. Pat. No. 3,140,251 issued Jul. 7, 1964 to Plank et al.; and U.S. Pat. No. 3,140,253 issued Jul. 7, 1964 to Plank et al.). Typical replacing cations can include metal cations, e.g., rare earth, Group IA, Group IIA and Group VIII metals, as well as their mixtures. Of the replacing metallic cations, cations of metals such as rare earth, Mn, Ca, Mg, Zn, Cd, Pt, Pd, Ni, Co, Ti, Al, Sn, and Fe are particularly preferred.

The hydrogen, ammonium, and metal components can be ion-exchanged into the SSZ-63. The SSZ-63 can also be impregnated with the metals, or the metals can be physically and intimately admixed with the SSZ-63 using standard methods known to the art.

Typical ion-exchange techniques involve contacting the synthetic molecular sieve with a solution containing a salt of the desired replacing cation or cations. Although a wide variety of salts can be employed, chlorides and other halides, acetates, nitrates, and sulfates are particularly preferred. The molecular sieve is usually calcined prior to the ion-exchange procedure to remove the organic matter present in the channels and on the surface, since this results in a more effective ion exchange. Representative ion exchange techniques are disclosed in a wide variety of patents including U.S. Pat. No. 3,140,249 issued on Jul. 7, 1964 to Plank et al.; U.S. Pat. No. 3,140,251 issued on Jul. 7, 1964 to Plank et al.; and U.S. Pat. No. 3,140,253 issued on Jul. 7, 1964 to Plank et al.

Following contact with the salt solution of the desired replacing cation, the molecular sieve is typically washed with water and dried at temperatures ranging from 65° C. to about 200° C. After washing, the molecular sieve can be calcined in air or inert gas at temperatures ranging from about 200° C. to about 800° C. for periods of time ranging from 1 to 48 hours, or more, to produce a catalytically active product especially useful in hydrocarbon conversion processes.

Regardless of the cations present in the synthesized form of SSZ-63, the spatial arrangement of the atoms which form the basic crystal lattice of the molecular sieve remains essentially unchanged.

SSZ-63 can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the SSZ-63 can be extruded before drying, or, dried or partially dried and then extruded.

SSZ-63 can be composited with other materials resistant to the temperatures and other conditions employed in organic conversion processes. Such matrix materials include active and inactive materials and synthetic or naturally occurring zeolites as well as inorganic materials such as clays, silica and metal oxides. Examples of such materials and the manner in which they can be used are disclosed in U.S. Pat. No. 4,910,006, issued May 20, 1990 to Zones et al., and U.S. Pat. No. 5,316,753, issued May 31, 1994 to Nakagawa, both of which are incorporated by reference herein in their entirety.

SSZ-63 may be used for the catalytic reduction of the oxides of nitrogen in a gas stream. Typically, the gas stream also contains oxygen, often a stoichiometric excess thereof. Also, the SSZ-63 may contain a metal or metal ions within or on it which are capable of catalyzing the reduction of the nitrogen oxides. Examples of such metals or metal ions include copper, cobalt and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

EXAMPLES

The following examples demonstrate but do not limit the present invention.

Example 1

Synthesis of the Structure-Directing Agent A (N-cyclodecyl-N-methyl-pyrrolidinium cation)

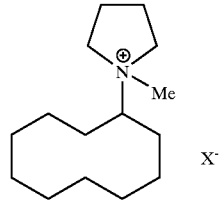

The anion (X$^-$) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

The structure-directing agent (SDA) N-cyclodecyl-N-methyl-pyrrolidinium cation was synthesized according to the procedure described below (see Scheme 1). To a solution of cyclodecanone (25 gm; 0.16 mol) in 320 ml anhydrous hexane in a three-necked round bottom flask equipped with a reflux condenser and a mechanical stirrer, 34 gm of pyrrolidine (0.48 mol) and 48 gm (0.4 mol) anhydrous magnesium sulfate were added. The resulting mixture was stirred while heating at reflux for five days. The reaction mixture was filtered through a fritted-glass funnel. The filtrate was concentrated at reduced pressure on a rotary evaporator to yield 32 gm (96%) of the expected enamine (1-cyclodec-1-enyl-pyrrolidine) as a reddish oily substance. $^1$H-NMR and $^{13}$C-NMR spectra were acceptable for the desired product. The enamine was reduced to the corresponding amine (N-cyclodecyl-pyrrolidine) in quantitative yield via catalytic hydrogenation in the presence of 10% Pd on activated carbon at hydrogen pressure of 55 PSI in ethanol.

Quaternization of N-cyclodecyl-pyrrolidine with methyl iodide (Synthesis of N-cyclodecyl-N-methyl-pyrrolidinium iodide)

To a solution of 30 gm (0.14 mol.) of N-cyclodecyl-pyrrolidine in 250 ml anhydrous methanol in a one liter reaction flask, 30 gm (0.21 mol.) of methyl iodide was added. The reaction mixture was mechanically stirred for 48 hours at room temperature. Then, a 0.5 mole equivalent of methyl iodide was added and the mixture was heated to reflux and refluxed for 30 minutes. The reaction mixture was then cooled down and concentrated under reduced pressure on a rotary evaporator to give the product as a pale yellow solid material. The product was purified by dissolving in acetone and then precipitating by adding diethyl ether. The recrystallization yielded 46 gm (93%) of the pure N-cyclodecyl-N-methyl-pyrrolidinium iodide. $^{1}$H-NMR and $^{13}$C-NMR were ideal for the product.

Ion Exchange (Synthesis of N-cyclodecyl-N-methyl-pyrrolidinium hydroxide)

N-cyclodecyl-N-methyl-pyrrolidinium iodide (45 gm; 0.128 mol) was dissolved in 150 ml water in a 500 ml plastic bottle. To the solution, 160 gm of Ion-Exchange Resin-OH (BIO RAD® AH1-X8) was added and the mixture was stirred at room temperature overnight. The mixture was filtered and the solids were rinsed with an additional 85 ml of water. The reaction afforded 0.12 mole of the SDA (N-cyclodecyl-N-methyl-pyrrolidinium hydroxide) as indicated by titration analysis with 0.1N HCl.

Scheme 1

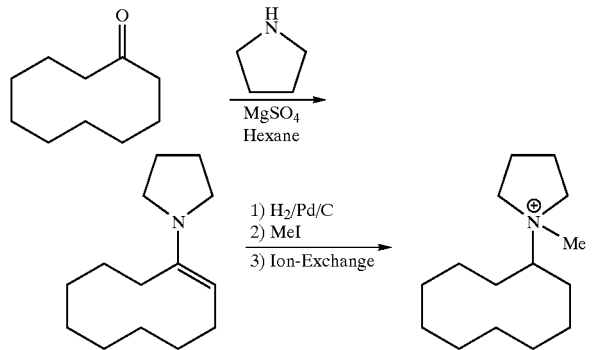

Example 2
Synthesis of Borosilicate SSZ-63

A 23 cc Teflon liner was charged with 4.9 gm of 0.61M aqueous solution of N-cyclodecyl-N-methyl-pyrrolidinium hydroxide (3 mmol SDA), 1.2 gm of 1M aqueous solution of NaOH (1.2 mmol NaOH) and 5.9 gm of de-ionized water. To this mixture, 0.06 gm of sodium borate decahydrate (0.157 mmol of $Na_2B_4O_7 \cdot 10H_2O$; ~0.315 mmol $B_2O_3$) was added and stirred until completely dissolved. To this solution, 0.9 gm of CABO-SIL M-5® fumed silica (~14.7 mmol $SiO_2$) was added and thoroughly stirred by hand. The resulting gel was capped off and placed in a Parr steel autoclave and heated in an oven at about 160° C. while tumbling at about 43 rpm. The reaction was monitored by periodically monitoring the pH of the gel, and by looking for crystal growth using scanning electron microscopy (SEM). Once the crystallization was completed, after heating for 12 days at the conditions described above, the starting reaction gel turned into a clear liquid layer and a fine powdery precipitate. The mixture was filtered through a fritted-glass funnel. The collected solids were thoroughly washed with water and, then, rinsed with acetone (~20 ml) to remove any organic residues. The solids were allowed to air-dry over night and, then, dried in an oven at 120° C. for 1 hour. The reaction afforded 0.85 gram of SSZ-63. The originality of SSZ-63 was determined from its unique XRD pattern, and by transmission electron microscopy analysis

Example 3
Conversion of Borosilicate SSZ-63 to Aluminosilicate SSZ-63

Borosilicate SSZ-63 synthesized as described in Example 2 above and calcined as shown in Example 17 below was suspended in 1M solution of aluminum nitrate nonahydrate (15 ml of 1M $Al(NO_3)_3 \cdot 9H_2O$ soln./1 gm zeolite). The suspension was heated at reflux for 48 hours. The mixture was then filtered and the collected solids were thoroughly rinsed with water and air-dried overnight. The solids were further dried in an oven at 120° C. for 2 hours.

Example 4
Synthesis of Germanosilicate SSZ-63

A 23 cc Teflon liner was charged with 4.85 gm of 0.61M aqueous solution of N-cyclodecyl-N-methyl-pyrrolidinium hydroxide (3 mmol SDA), 1.25 gm of 1M aqueous solution of NaOH (1.25 mmol NaOH) and 5.8 gm of de-ionized water. To this mixture, 0.25 gm of $GeO_2$ (2.39 mmol) was added and stirred until completely dissolved. To this solution, 0.7 gm of CAB-O-SIL M-5® (~11.4 mmol $SiO_2$) was added and thoroughly stirred by hand. The resulting gel was capped off and placed in a Parr steel autoclave and heated in an oven at about 160° C. while tumbling at about 43 rpm. The reaction was monitored by periodically monitoring the pH of the gel, and by looking for crystal growth using scanning electron microscopy (SEM). Once the crystallization was completed, after heating for six days, the starting reaction gel turned into a clear liquid layer and a fine powdery precipitate. The mixture was filtered through a fritted-glass funnel. The collected solids were thoroughly washed with water and, then, rinsed with acetone (~20 ml) to remove any organic residues. The solids were allowed to air-dry over night and, then, dried in an oven at 120° C. for one hour. The reaction afforded 0.73 gram of SSZ-63.

Examples 5–16
Synthesis of Borosilicate SSZ-63

SSZ-63 was synthesized at varying $SiO_2/B_2O_3$ ratios in the starting synthesis gel. This was accomplished by using the synthetic conditions described in Example 2 keeping everything the same while changing the $SiO_2/B_2O_3$ ratios in the starting gel. This was done by keeping the amount of CAB-O-SIL M-5® (the source of $SiO_2$) constant while varying the amount of sodium borate decahydrates added in each run. Consequently, varying the amount of sodium borate decahydrates led to varying the $SiO_2/Na$ ratios in the starting gels. The table below shows the $SiO_2/B_2O_3$ and $SiO_2/Na$ ratios and the observed products for each run.

| Example No. | $SiO_2/B_2O_3$ | $SiO_2/Na$ | Crystallization Time (days) | Products |
|---|---|---|---|---|
| 5 | ∞ | 14.7 | 6 | BETA (BEA*) |
| 6 | 280 | 13.9 | 12 | SSZ-63 |
| 7 | 140 | 13.3 | 12 | SSZ-63 |
| 8 | 93 | 12.7 | 12 | SSZ-63 |
| 9 | 70 | 12.1 | 12 | SSZ-63 |
| 10 | 56 | 11.6 | 12 | SSZ-63 |
| 11 | 47 | 11.2 | 12 | SSZ-63 |
| 12 | 40 | 10.7 | 12 | SSZ-63 |
| 13 | 31 | 10 | 12 | SSZ-63 |
| 14 | 23 | 9 | 12 | SSZ-63 |
| 15 | 19 | 8.2 | 12 | SSZ-63 |
| 16 | 12.6 | 6.8 | 12 | SSZ-63 |

$SiO_2/^-OH = 3.7$,
$SiO_2/R^+ = 4.9$,

-continued

| Example No. | $SiO_2/B_2O_3$ | $SiO_2/Na$ | Crystallization Time (days) | Products |
|---|---|---|---|---|

$H_2O/SiO_2 = 44$
($R^+$ = organic cation (SDA))

Example 17

Calcination of SSZ-63

The material from Example 3 is calcined in the following manner. A thin bed of material is heated in a muffle furnace from room temperature to 120° C. at a rate of 1° C. per minute and held at 120° C. for three hours. The temperature is then ramped up to 540° C. at the same rate and held at this temperature for five hours, after which it is increased to 594° C. and held there for another five hours. A 50/50 mixture of air and nitrogen is passed over the SSZ-63 at a rate of 20 standard cubic feet per minute during heating.

Example 18

$NH_4$ Exchange

Ion exchange of calcined SSZ-63 material (as prepared in Example 2, and calcined as in Example 17) is performed using $NH_4NO_3$ to convert the SSZ-63 from its $Na^+$ form to the $NE_4^+$ form, and, ultimately, the $H^+$ form. Typically, the same mass of $NH_4NO_3$ as SSZ-63 is slurried in water at a ratio of 25–50:1 water to SSZ-63. The exchange solution is heated at 95° C. for two hours and then filtered. This procedure can be repeated up to three times. Following the final exchange, the SSZ-63 is washed several times with water and dried. This $NH_4^+$ form of SSZ-63 can then be converted to the $H^+$ form by calcination (as described in Example 17) to 540° C.

Example 19

Constraint Index Determination

The hydrogen form of the SSZ-63 of Example 2 (after treatment according to Examples 17, 3 and 18) is pelletized at 2–3 KPSI, crushed and meshed to 20–40, and then >0.50 gram is calcined at about 540° C. in air for four hours and cooled in a desiccator. 0.50 Gram is packed into a ⅜ inch stainless steel tube with alundum on both sides of the molecular sieve bed. A Lindburg furnace is used to heat the reactor tube. Helium is introduced into the reactor tube at 10 cc/min. and at atmospheric pressure. The reactor is heated to about 315° C., and a 50/50 (w/w) feed of n-hexane and 3-methylpentane is introduced into the reactor at a rate of 8 µl/min. Feed delivery is made via a Brownlee pump. Direct sampling into a gas chromatograph begins after ten minutes of feed introduction. The Constraint Index value is calculated from the gas chromatographic data using methods known in the art. SSZ-63 has a Constraint Index of 1.1 after 10 minutes at 315° C. with 87.7% feed conversion. The Constraint Index dropped with time on stream (0.6 at 100 minutes) suggesting that SSZ-63 is a large pore molecular sieve.

Example 20

Hydrocracking of n-Hexadecane

A sample of SSZ-63 as prepared in Example 2 was treated as in Examples 17, 3 and 18. Then a sample was slurried in water and the pH of the slurry was adjusted to a pH of ~10 with dilute ammonium hydroxide. To the slurry was added a solution of $Pd(NH_3)_4(NO_3)_2$ at a concentration which would provide 0.5 wt. % Pd with respect to the dry weight of the molecular sieve sample. This slurry was stirred for 48 hours at 100° C. After cooling, the slurry was filtered through a glass frit, washed with de-ionized water, and dried at 100° C. The catalyst was then calcined slowly up to 482° C. in air and held there for three hours.

The calcined catalyst was pelletized in a Carver Press and crushed to yield particles with a 20/40 mesh size range. Sized catalyst (0.5 g) was packed into a ¼ inch OD tubing reactor in a micro unit for n-hexadecane hydroconversion. The table below gives the run conditions and the products data for the hydrocracking test on n-hexadecane. After the catalyst was tested with n-hexadecane, it was titrated using a solution of butyl amine in hexane. The temperature was increased and the conversion and product data evaluated again under titrated conditions. The results shown in the table below show that SSZ-63 is effective as a hydrocracking catalyst.

| | Temperature | |
|---|---|---|
| | 500° F. (260° C.) | 560° F. (293° C.) |
| Time-on-Stream (hrs.) | 6.1–7.1 | 47.6–50.1 |
| WHSV | 1.55 | 1.55 |
| PSIG | 1200 | 1200 |
| Titrated? | No | Yes |
| n-16, % Conversion | 100 | 96.5 |
| Hydrocracking Conv. | 93.4 | 34.95 |
| Isomerization Selectivity, % | 6.6 | 63.8 |
| Cracking Selectivity, % | 93.4 | 36.2 |
| C4–, % | 8.8 | 31.85 |
| C5/C4 | 9.6 | 12.85 |
| C5 + C6/C5, % | 23.34 | 18.1 |
| DMB/MP | 0.12 | 0.07 |
| C4 – C13 i/n yield | 6.98 | 4.88 |
| C7 – C13 yield | 64.84 | 26.6 |

Example 21

Argon Adsorption Analysis

SSZ-63 has a micropore volume of 0.22 cc/gm based on argon adsorption isotherm at 87.6 K recorded on ASAP 2010 equipment from Micrometers. The low-pressure dose was 3.00 cm³/g (STP) with 15-s equilibration interval. The argon adsorption isotherm was analyzed using the density function theory (DFT) formalism and parameters developed for activated carbon slits by Olivier (*Porous Mater.*, 1995, 2, 9) using the Saito Foley adaptation of the Horvarth-Kawazoe formalism (*Microporous Materials*, 1995, 3, 531) and the conventional t-plot method (*J. Catalysis*, 1965, 4, 319). Analogous measurements were made with nitrogen using the Digisorb system.

What is claimed is:

1. In a process for the reduction of oxides of nitrogen contained in a gas stream in the presence of oxygen wherein said process comprises contacting the gas stream with a zeolite, the improvement comprising using as the zeolite a zeolite having a mole ratio greater than about 15 of an oxide of a first tetravalent element to an oxide of a second tetravalent element which is different from said first tetravalent element, trivalent element, pentavalent element or mixture thereof and having, after calcination, the X-ray diffraction lines of Table II.

2. The process of claim 1 wherein said zeolite contains a metal or metal ions capable of catalyzing the reduction of the oxides of nitrogen.

3. The process of claim 2 wherein the metal is copper, cobalt or mixtures thereof.

4. The process of claim 2 wherein the gas stream is the exhaust stream of an internal combustion engine.

* * * * *